(12) United States Patent
Krish et al.

(10) Patent No.: US 6,187,432 B1
(45) Date of Patent: *Feb. 13, 2001

(54) COMPOSITE PRESSURE SENSITIVE ADHESIVE

(75) Inventors: Prem Krish, Aurora; Li Xie, Painesville; Tamara L. McCartney, Stow, all of OH (US)

(73) Assignee: Avery Dennison Corporation, Pasadena, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/815,383

(22) Filed: Mar. 11, 1997

(51) Int. Cl.[7] ................................. B32B 15/04
(52) U.S. Cl. .................. 428/343; 428/41.8; 428/352; 428/354; 428/355; 428/355 AC; 428/355 EN
(58) Field of Search .................. 428/41.8, 343, 428/352, 354, 355, 355 AC, 355 EN

(56) References Cited

U.S. PATENT DOCUMENTS

| | | | |
|---|---|---|---|
| 3,314,838 | 4/1967 | Erwin | 156/71 |
| 3,581,884 | 6/1971 | Caldwell et al. | 206/59 |
| 3,627,559 | 12/1971 | Chen | 117/45 |
| 3,741,786 | 6/1973 | Torrey | 117/3.1 |
| 3,847,718 | 11/1974 | Watson | 161/39 |
| 3,857,731 | 12/1974 | Merrill, Jr. et al. | 117/122 |
| 3,942,713 | 3/1976 | Olson et al. | 229/62 |
| 4,214,024 | 7/1980 | Jacobson | 428/41 |
| 4,735,837 | 4/1988 | Miyasaka et al. | 428/40 |
| 4,769,264 | 9/1988 | Dreger | 428/40 |
| 4,786,046 | 11/1988 | Freeman et al. | 271/276 |
| 4,855,170 | 8/1989 | Darvell et al. | 428/40 |
| 4,874,671 | 10/1989 | Tahara et al. | 428/447 |
| 4,889,234 | 12/1989 | Sorensen et al. | 206/459 |
| 4,894,259 | 1/1990 | Kuller | 427/208.8 |
| 4,925,779 | 5/1990 | Policht et al. | 430/403 |
| 4,972,615 | 11/1990 | Grant | 40/641 |
| 4,995,641 | 2/1991 | Landry et al. | 283/67 |
| 5,024,880 | 6/1991 | Veasley et al. | 428/317.5 |
| 5,045,386 | 9/1991 | Stan et al. | 428/262 |
| 5,049,417 | 9/1991 | Tsubota et al. | 427/208.6 |

(List continued on next page.)

FOREIGN PATENT DOCUMENTS

| | | |
|---|---|---|
| 2045247 | 6/1991 | (CA) . |
| 0157566 | 3/1985 | (EP) . |
| 0210304 | 6/1985 | (EP) . |
| 0402000 | 5/1990 | (EP) . |
| 2211759 | 10/1987 | (GB) . |
| 8504602 | 10/1985 | (WO) . |
| 9625469 | 8/1996 | (WO) . |

OTHER PUBLICATIONS

International Search Report for Application No. PCT/US98/02386; Date of Mailing Jul. 8, 1998.

John Raterman, TAPPI Proceedings 1987 Polymers, Laminations and Coatings Conference, Book 2, p. 661–664, "The Evolution of Pressure–Sensitive Adhesive Spray".

*Primary Examiner*—Terrel Morris
*Assistant Examiner*—Norca L. Torres-Velazquez
(74) *Attorney, Agent, or Firm*—Renner, Otto, Boisselle & Sklar

(57) ABSTRACT

This invention relates to a composite pressure sensitive adhesive composition comprising at least one first pressure sensitive adhesive material in the form of at least one continuous phase, and at least one second pressure sensitive adhesive material in the form of at least one discontinuous phase, said discontinuous phase being dispersed in said continuous phase. The invention also relates to a laminate having a composite pressure sensitive adhesive composition overlying the surface of a substrate, and to a process for making the foregoing laminate. The laminates can be used in making labels, tapes, and the like.

12 Claims, 3 Drawing Sheets

U.S. PATENT DOCUMENTS

| | | | |
|---|---|---|---|
| 5,120,587 | 6/1992 | McDermott, III et al. | 428/40 |
| 5,139,847 | 8/1992 | Breen | 428/40 |
| 5,141,789 | 8/1992 | Matsuzawa et al. | 428/40 |
| 5,143,972 | 9/1992 | Groves | 525/71 |
| 5,194,299 | 3/1993 | Fry | 427/208.6 |
| 5,290,842 | 3/1994 | Sasaki et al. | 524/271 |
| 5,306,374 | 4/1994 | Hambright | 156/247 |
| 5,322,731 | 6/1994 | Callahan, Jr. et al. | 428/327 |
| 5,338,490 | 8/1994 | Dietz et al. | 252/500 |
| 5,344,681 | 9/1994 | Calhoun et al. | 428/42 |
| 5,387,466 | 2/1995 | Therriault et al. | 428/355 |
| 5,405,565 | 4/1995 | Sumida et al. | 264/171 |
| 5,421,933 | 6/1995 | Nedblake et al. | 156/249 |
| 5,431,763 | 7/1995 | Bradshaw | 156/256 |
| 5,449,540 | 9/1995 | Calhoun et al. | 428/42 |
| 5,507,901 | 4/1996 | Limina et al. | 156/200 |
| 5,585,178 | 12/1996 | Calhoun et al. | 428/343 |

COMPOSITE PRESSURE SENSITIVE ADHESIVE

TECHNICAL FIELD

This invention relates to composite pressure sensitive adhesives and, more particularly, to composite pressure sensitive adhesive compositions comprising at least one first pressure sensitive adhesive material in the form of at least one continuous phase, and at least one second pressure sensitive adhesive material in the form of at least one discontinuous phase dispersed in the continuous phase of the first pressure sensitive adhesive material. The invention also relates to laminates having the composite pressure sensitive adhesive composition overlying the surface of a substrate, and to a process for making such laminates. The laminates are particularly suitable for use in making, for example, labels, tapes, and the like.

BACKGROUND OF THE INVENTION

Pressure sensitive adhesives derive their name from the way they work. Unlike other types of glues that form a bond with the surface substrate that they are applied to, through evaporating or absorbing a solvent to form a solid material, pressure sensitive adhesives stick to the substrate through the use of slight pressure.

The performance of pressure sensitive adhesives can be characterized through a variety of physical tests. The tests are designed to measure the strength of the adhesive, or its resistance to various environmental conditions. The typical adhesive properties include initial tack, ultimate adhesion, shear resistance, U.V. resistance, solvent resistance, mandrel hold, cold flow, minimum application temperature and service temperature range.

Initial tack is the immediate holding power of the adhesive upon contact with a substrate to which it is applied. An adhesive with high initial tack will grab the substrate quickly. An adhesive with low initial tack will exhibit a low level of adhesion when first applied and may be removed cleanly.

Ultimate adhesion is the ultimate or maximum holding power that the adhesive will achieve as the adhesive penetrates into the substrate. The time required to obtain ultimate adhesion may depend on the stiffness (shear) of the adhesive, the roughness of the substrate and the temperature of the environment. Dwell time can vary from 10 minutes to 24 hours depending on the conditions. Initial tack and ultimate adhesion are not necessarily related. It is possible that an adhesive with high initial tack may not obtain as high an ultimate adhesion as an adhesive with low initial tack.

Shear resistance is a measure of internal cohesive strength of the adhesive. The shear of the adhesive is an indication of how soft an adhesive is. A low shear adhesive (soft) has more of a tendency to flow (resulting in higher initial tack) and has a higher chance that the adhesive will split apart if put under stress. A high shear adhesive (firm) is less likely to split under stress because of its good internal cohesive strength, and will be less likely to flow. The ability of an adhesive to flow, not only affects the initial tack but can determine the amount of "edge ooze". Edge ooze is a term used to describe the flow of adhesive over the edge of the substrate to which it is applied. Edge ooze causes sticky edges and can cause feeding problems and contamination in some printing processes when the adhesive is used in making labels.

U.V. resistance is the ability of the adhesive to resist prolonged exposure to ultraviolet light without loosing adhesion or changing color.

Solvent resistance is the ability of the adhesive to withstand exposure to solvents without loosing adhesion. Solvents could include water, alcohol, petrochemical solvents, organic solvents, plasticizers and the like. The solvents could be present in the environment that the adhesive is used in or could be within the substrate to which the adhesive is applied.

Mandrel hold is the ability to adhere to a curved or tight radius surface. Good mandrel hold is the resistance to "flag" or "wing up".

Cold flow is the ability of the adhesive to flow into the substrate to which it is applied at temperatures below normal. Adhesives with good cold flow are considered "cold temperature" or "all temperature" adhesives.

Minimum application temperature is the lowest temperature at which an adhesive will function. A pressure sensitive adhesive will begin to stiffen and lose its adhesive properties as the temperature decreases. Most adhesives have a minimum application temperature of 40–50° F. The minimum application temperature is effected by what is known as the "glass transition temperature", the temperature where the adhesive crystallizes and becomes solid. Cold temperature adhesives have minimum application temperatures as low as −20° F.

Service temperature range is the temperature range that the adhesive will function after the adhesive has been applied to a substrate and allowed to build to ultimate adhesion. Most adhesives have a range as low as −65° F. and as high as 200° F. with paper substrates and 300° F. with film substrates.

The pressure sensitive adhesives materials of the prior art are monolithic materials and as a result have properties that are limited to such monolithic materials. While these monolithic materials may exhibit adhesives with desirable properties (e.g., initial tack, shear resistance,) for certain applications, there is a limitation as to the various combinations of properties that can be provided by such monolithic adhesives. There is no universal pressure sensitive adhesive having acceptable properties for all applications. It would be advantageous to provide a pressure sensitive adhesive material that offered a wider selection of improved properties and thus applications of use. The present invention provides such advantages.

U.S. Pat. No. 3,627,559 discloses an adhesive tape comprised of a backing, a layer of a water soluble gum, and a discontinuous layer of a pressure-sensitive adhesive on the gum. The reference indicates that when applied to a dry substrate, the tape becomes peelable or releasable on being moistened. When applied to a wet substrate, the tape is resistant to peeling or releasing on being moistened.

U.S. Pat. No. 5,024,880 discloses phase-separated, polymerized, cellular pressure-sensitive adhesive membranes possessing a high degree of compression recovery comprising from about 70 parts to about 98 parts of an acrylic polymer, and from about 30 parts to about 2 parts of a saturated hydrocarbon elastomer or blend of hydrocarbon elastomers containing at least one segment having a lower glass transition temperature than the acrylic copolymer. The reference indicates that the adhesive has at least a first phase and a second phase, the first phase consisting primarily of the elastomer, and at least one phase is a continuous phase. The reference also indicates that the disclosed cellular pressure-sensitive adhesive membranes have improved low temperature shock resistance over otherwise identical cellular pressure-sensitive adhesive membranes containing no elastomer.

SUMMARY OF THE INVENTION

This invention relates to a composite pressure sensitive adhesive composition comprising at least one first pressure sensitive adhesive material in the form of at least one continuous phase, and at least one second pressure sensitive adhesive material in the form of at least one discontinuous phase, said discontinuous phase being dispersed in said continuous phase. The invention also relates to a laminate having a composite pressure sensitive adhesive composition overlying the surface of a substrate, and to a process for making the foregoing laminate. The laminates can be used in making labels, tapes, and the like.

BRIEF DESCRIPTION OF THE DRAWINGS

In the annexed drawings, like references indicate like parts or features.

DESCRIPTION OF THE PREFERRED EMBODIMENTS

Figure 1:
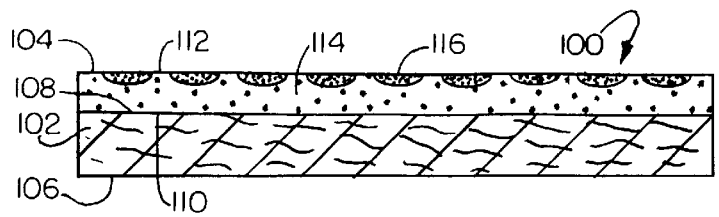
FIG. 1 is a schematic illustration of the side view of a laminate embodying the present invention in a particular form wherein a composite adhesive composition containing two pressure sensitive adhesive materials is adhered to the surface of a substrate, one of the pressure sensitive adhesive materials being dispersed as a discontinuous phase on the surface of the other pressure sensitive material.

The composite pressure sensitive adhesive compositions of the invention contain at least two pressure sensitive adhesive materials, one being a first pressure sensitive adhesive material which is in the form of a continuous phase, and the other being a second pressure sensitive adhesive material which is in the form of a discontinuous phase dispersed in the continuous phase of the first pressure sensitive adhesive material. In one embodiment, two or more first pressure sensitive adhesive materials can be used to form a single or two or more continuous phases. Similarly, two or more second pressure sensitive adhesive materials can be used to form a single or two or more discontinuous phases. In one embodiment, the composite adhesive compositions are non-cellular adhesive compositions. When applied to a substrate in accordance with the inventive process, which is discussed in greater detail below, the adhesive materials can be in the form of hot melt adhesives, solutions or emulsions. The composite pressure sensitive adhesives can be permanent adhesives or removable adhesives. The first adhesive material and the second adhesive material are sufficiently non-soluble relative to each other so that upon application to a substrate and subsequent drying at least about 50% by weight, and in one embodiment at least about 70% by weight, and in one embodiment at least about 90% by weight, of the second adhesive material remains in a discontinuous phase. The weight ratio of the first pressure sensitive adhesive material to the second pressure sensitive adhesive material is generally in the range of about 500:1 to about 5:1, and in one embodiment about 100:1 to about 10:1, and in one embodiment about 20:1 to about 10:1.

The pressure-sensitive adhesive materials that can be used as either the first or second pressure sensitive adhesive material include rubber based adhesives, acrylic adhesives, vinyl ether adhesives, silicone adhesives, and mixtures of two or more thereof. Included are the pressure sensitive adhesive materials described in "Adhesion and Bonding", *Encyclopedia of Polymer Science and Engineering,* Vol. 1, pages 476–546, Interscience Publishers, 2nd Ed. 1985, the disclosure of which is hereby incorporated by reference. The pressure sensitive adhesive materials that are useful may contain as a major constituent an adhesive polymer such as natural, reclaimed or styrene butadiene rubber, tackified natural or synthetic rubbers, styrene butadiene or styrene isoprene block copolymers, random copolymers of ethylene and vinyl acetate, ethylene-vinyl-acrylic terpolymers, polyisobutylene, poly(vinyl ether), poly(acrylic) ester, etc. The pressure sensitive adhesive materials are typically characterized by glass transition temperatures in the range of about $-70°$ C. to about $10°$ C.

The acrylic adhesives may contain as a major constituent acrylic type polymers containing carboxylic acids which are obtained from vinyl type monomers containing carboxyl groups such as acrylic acid, methacrylic acid, etc., and acrylic type polymers containing hydroxyl groups which are obtained from vinyl type monomers containing hydroxyl groups such as 2-hydroxyethyl methacrylate, etc. In one embodiment, the acrylic adhesive material is obtained from the copolymerization of an alkyl acrylate such as butyl acrylate, 2-ethylhexyl acrylate, or isononyl acrylate; a polar monomer such as acrylic acid, acrylamide, or N-vinyl-2-pyrrolidone, and another monomer such as an acrylate other than the acrylate mentioned above, methacrylate, styrene, vinyl acetate, etc.

Block copolymers which may be employed include thermoplastic block copolymers having linear, radial or star configurations and having the A blocks and B blocks formed into what are generally termed as ABA block copolymers. In one embodiment, the A block is a monoalkenyl arene, mainly polystyrene, having a molecular weight between about 4,000 and about 50,000, and in one embodiment between about 7,000 and about 30,000. Other suitable A blocks may be formed from alpha-methyl styrene, t-butyl styrene and other ring alkylated styrenes as well as mixtures thereof. The A block content is from about 10% to about 50%, and in one embodiment between about 10% and about 30%. B is an elastomeric conjugated diene such as butadiene or isoprene having an average molecular weight of from about 5,000 to about 500,000, and in one embodiment from about 50,000 to 200,000. In one embodiment, ABA triblock and AB diblock copolymers comprise the majority of the block copolymer elastomer of the adhesive, the percent diblock being less than about 95% of the block copolymer, and in one embodiment less than about 85%, and in one embodiment less than about 75%. Other conventional diene elastomers may be used to a minor extent, but not so as to significantly affect the adhesion properties.

Specific examples of ABA-type copolymers of styrene and isoprene are Kraton 1107 and Kraton 1117 from Shell Chemical Company. ABA-type copolymers of styrene-butadiene are available from Firestone under the designations Steron 840A and 845A. Other commercially available copolymer adhesives include: random copolymer of ethylene and vinyl acetate having a melt-flow index of 2500 in a vinyl acetate content of 14% by weight (Escorene MVO-2514) available from Exxon Chemical; styrene butadiene block synthetic rubber having a styrene content of 30% by weight (Finaprene 411) available from Fina Chemical Company; random copolymer of ethylene and vinyl acetate having a melt-flow index of 148 and a vinyl acetate content of 18.5% by weight (Elvax 420) available from DuPont; and random copolymer of ethylene and vinyl acetate having a melt-flow index of 57 and a vinyl acetate content of 40% by weight of an Elvax 40W.

Other materials in addition to the foregoing resins may be included in the pressure sensitive adhesive materials. These include solid tackifying resins, liquid tackifiers (often referred to as plasticizers), antioxidants, fillers, pigments, waxes, etc. The adhesive materials may contain a blend of solid tackifying resins and liquid tackifying resins (or liquid plasticizers).

The tackifying resins include those aliphatic hydrocarbon resins made from the polymerization of a feed stream consisting mainly of unsaturated species containing 4 to 6 carbon atoms; rosin esters and rosin acids; mixed aliphatic/aromatic tackifying resins; polyterpene tackifiers; and hydrogenated tackifying resins. The hydrogenated resins can include resins made from the polymerization and subsequent hydrogenation of a feedstock consisting mostly of dicyclopentadiene; resins produced from the polymerization and subsequent hydrogenation of pure aromatic feedstocks such as styrene, alpha-methyl styrene, vinyl toluene; resins fashioned from the polymerization and subsequent hydrogenation of an unsaturated aromatic feedstream wherein the feedstream mainly contains species having from about 7 to about 10 carbon atoms; hydrogenated polyterpene resins; and hydrogenated aliphatic and aliphatic/aromatic resins. Useful tackifying resins include the aliphatic hydrocarbon resins and the hydrogenated resins. Specific examples include rosin acids, rosin esters, styrenated terpene resins, oil-soluble phenolics, and polyterpenes. Commercially available tackifying resins include Escorez 1310 from Exxon Chemical Co., Wingtack Plus, Wingtack 10 and Wingtack 95 available from Goodyear Chemical Co., Hercolyn D from Hercules, Inc., and Zonarez A-25 from Arizona Chemical Co. The tackifying resin component may comprise about 5% to about 60% by weight of the pressure sensitive adhesive material, and in one embodiment about 10% to about 40% by weight.

---

The following rubber based adhesives can be used:

| | |
|---|---|
| PSA-1: | A rubber-resin hot melt general purpose permanent pressure sensitive adhesive having a density of 7.88 lb/gal and a viscosity of 7000–11000 cps @ 350° F. |
| PSA-2: | A rubber-resin hot melt permanent pressure sensitive adhesive for dairy label applications having a density of 8.25 lb/gal and a viscosity of 4500–7500 cps @ 350° F. |
| PSA-3: | A rubber-resin hot melt general purpose permanent pressure sensitive adhesive having a density of 7.8 lb/gal and a viscosity of 14,000–19,000 cps @ 350° F. |

The following acrylic adhesives can be used:

| | |
|---|---|
| PSA-4: | Acrylic emulsion pressure sensitive adhesive having a solids content of 60% by weight and a pH of 5.2. |

| | |
|---|---|
| PSA-5: | A permanent tackified acrylic emulsion pressure sensitive adhesive having a solids content of 58.5% by weight and a pH of 7.2. |
| PSA-6: | A removable acrylic emulsion pressure sensitive adhesive having a solids content of 61% by weight and a pH of 6.5. |
| PSA-7: | A removable acrylic emulsion pressure sensitive adhesive having a solids content of 52% by weight and a pH of 9.2. |
| PSA-8: | A removable acrylic emulsion pressure sensitive adhesive having a solids content of 40% by weight and a pH of 6.6. |
| PSA-9: | A repulpable acrylic emulsion pressure sensitive adhesive having a solids content of 60% by weight. |

Commercially available acrylic adhesives that can be used include Narcor 38-4542 (a product of National Starch identified as a removable acrylic emulsion pressure sensitive adhesive), E2920 (a product of Rohm & Haas identified as an acrylic emulsion pressure sensitive adhesive), and Aroset 2555 (a product of Ashland identified as an ultra removable acrylic emulsion pressure sensitive adhesive).

Examples of commercially available pressure sensitive silicone adhesives include PSA825-D1, PSA518-D1 and PSA6574-D1, which are available from GE Silicones.

In one embodiment, the first and second pressure sensitive adhesive materials are combined in a manner to provide a composite adhesive composition that is suitable for adhering to corrugated or high density polyethylene substrates. Corrugated and high density polyethylene substrates are difficult for adhesives to adhere to. In general, if an adhesive is permanent on these substrates it will be permanent on most substrates. The continuous phase of this composite adhesive composition can be a low cost acrylic pressure sensitive adhesive material. Examples include PSA-4, PSA-5 and PSA-9. The discontinuous phase can be comprised of a rubber based pressure sensitive adhesive material having enhanced corrugated adhesion characteristics, a silicone pressure sensitive adhesive material, or high performance acrylic emulsion pressure sensitive adhesive material. Examples include PSA6574-D1. In this embodiment, the weight ratio of the adhesive material in the continuous phase to the adhesive material in the discontinuous phase is in the range of about 500:1 to about 5:1, and in one embodiment about 100:1 to about 10:1, and in one embodiment about 20:1 to about 10:1.

In one embodiment, the composite adhesive composition is comprised of a silicone pressure sensitive adhesive material in the discontinuous phase, and a low cost acrylic or rubber based adhesive in the continuous phase. Silicone pressure sensitive adhesive materials (e.g., solvent silicones) have high adhesion, permanent adhesive properties but generally are costly and therefore their use is relatively limited. The composite adhesive compositions of the invention provide the advantage of using a silicone pressure sensitive adhesive at a relatively low overall material cost. Examples of such silicone adhesives include PSA825-D1, PSA518-D1 and PSA6574-D1. Examples of the acrylic and rubber based adhesives that can be used include PSA-4, PSA-5 and PSA-9. In this embodiment, the weight ratio of the acrylic or rubber based adhesive material in the continuous phase to the silicone adhesive in the discontinuous phase is in the range of about 500:1 to about 5:1, and in one embodiment about 100:1 to about 10:1.

In one embodiment, the composite adhesive composition is comprised of a hot melt rubber based pressure sensitive adhesive material in the continuous phase and a high performance solvent adhesive in the discontinuous phase. This composite adhesive composition exhibits enhanced adhesion to all substrates including corrugated substrates and high density polyethylene substrates. Examples of the hot melt rubber based pressure sensitive adhesive materials include PSA-1, PSA-2 and PSA-3. The high performance solvent adhesive can be a solvent silicone, acrylic or rubber based pressure sensitive adhesive material. Examples include PSA825-D1, PSA518-D1 and PSA6574-D1. In this embodiment, the weight ratio of the rubber based pressure sensitive adhesive material in the continuous phase to the high performance solvent adhesive material in the discontinuous phase is in the range of about 500:1 to about 5:1, and in one embodiment about 100:1 to about 10:1.

In one embodiment, the composite adhesive composition is comprised of a hot melt adhesive material with cold temperature properties in the continuous phase, and a high performance solvent adhesive having improved tack at cold temperatures in the discontinuous phase. This composition provides enhanced improved cold temperature performance characteristics. Examples of the continuous phase adhesive materials include PSA-2. The discontinuous phase adhesive material can be a solvent silicone, acrylic or rubber based pressure sensitive adhesive material. In this embodiment, the weight ratio of the adhesive material in the continuous phase to the adhesive material in the discontinuous phase is in the range of about 500:1 to about 5:1, and in one embodiment about 100:1 to about 10:1.

In one embodiment, the composite adhesive composition is comprised of a banded emulsion pressure sensitive adhesive material in the continuous phase and a high performance pressure sensitive adhesive material in the discontinuous phase. This composition provides the advantage of being able to use relatively low adhesive coat weights in selected regions with the objective of reducing edge ooze and adhesive buildup in laser printers, copiers, and the like. The continuous phase material can be a low flow acrylic emulsion pressure sensitive adhesive material. The discontinuous phase material can be a silicone, acrylic or rubber based pressure sensitive adhesive material. Examples include PSA-5 and PSA6574-1. In this embodiment, the weight ratio of the adhesive material in the continuous phase to the adhesive material in the discontinuous phase is in the range of about 500:1 to about 5:1, and in one embodiment about 100:1 to about 10:1.

In one embodiment, the composite adhesive composition is comprised of an adhesive material having low adhesion characteristics in the continuous phase, and a permanent adhesive material in the discontinuous phase. When the discontinuous phase material is dispersed on the surface of the continuous phase material, the resulting composition provides the advantage of a low cost weak adhesion base with a high adhesion top coat. Examples of useful continuous phase materials include Narcor 38-4542, PSA-6 and PSA-8. Examples of useful discontinuous phase materials include PSA-5. In this embodiment, the weight ratio of the adhesive material in the continuous phase to the adhesive material in the discontinuous phase is in the range of about 500:1 to about 5:1, and in one embodiment about 100:1 to about 10:1.

In one embodiment, the composite adhesive composition is comprised of a combination of adhesive materials selected to provide an adhesive composition that is removable from plastic substrates (e.g., polyolefins, polystyrenes, vinyls, polyesters, melamines, acrylics, etc). Examples of the continuous phase material include E2920. Examples of the discontinuous phase materials include PSA-6, PSA-7 and PSA-8. In this embodiment, the weight ratio of the adhesive material in the continuous phase to the adhesive material in the discontinuous phase is in the range of about 500:1 to about 5:1, and in one embodiment about 100:1 to about 10:1.

In one embodiment, the composite adhesive composition is a removable adhesive for a broad range of substrates including high energy substrates (e.g., stainless steel, glass, plastics) and low energy substrates (e.g., plastics, corrugated surfaces). The continuous phase material and the discontinuous phase material are selected to provide the combination of properties required to permit adherence and removability from such surfaces. Examples of the continuous phase materials include PSA-4, PSA-6 and E2920. Examples of the discontinuous phase material include PSA-6, PSA-7 and PSA-8. In this embodiment, the weight ratio of the adhesive material in the continuous phase to the adhesive material in the discontinuous phase is in the range of about 500:1 to about 5:1, and in one embodiment about 100:1 to about 10:1.

In one embodiment, the composite adhesive composition is comprised of a permanent adhesive material in the discontinuous phase and a removable adhesive material in the continuous phase. This composition can be classified as a primeness removable adhesive composition. An advantage of using this composition is that the cost is relatively low and the product exhibits low curl characteristics. Examples of the continuous phase material include PSA-6, PSA-7 and PSA-8. Examples of the discontinuous phase material include PSA-4. In this embodiment, the weight ratio of the adhesive material in the continuous phase to the adhesive material in the discontinuous phase is in the range of about 500:1 to about 5:1, and in one embodiment about 100:1 to about 10:1.

In one embodiment, the composite adhesive composition is comprised of a repulpable adhesive material as the continuous phase material and a high performance permanent adhesive material as the discontinuous phase material. The discontinuous phase material provides overall enhanced adhesion performance and the continuous phase material imparts repulpability. Examples of the discontinuous phase material include PSA-4 and PSA6574-D1. In this embodiment, the weight ratio of the adhesive material in the continuous phase to the adhesive material in the discontinuous phase is in the range of about 500:1 to about 5:1, and in one embodiment about 100:1 to about 10:1.

The laminates of the invention are comprised of a substrate and the inventive composite adhesive composition overlying a surface of the substrate. In one embodiment, the composite adhesive composition is adhered to the substrate in the form of a layer with the first adhesive material being in the form of a continuous phase overlying the substrate, and the second adhesive material dispersed as a discontinuous phase in the first adhesive material. The second adhesive material can be dispersed on the surface of the first adhesive material that is adhered to the substrate, or it can be dispersed on the surface opposite the surface in contact with the substrate. Alternatively, the second adhesive material can be dispersed throughout the layer of the first adhesive material.

In one embodiment, the first pressure sensitive material is in the form of a layer overlying the substrate, and another pressure sensitive adhesive material in the form of another layer overlies the layer of the first pressure sensitive material. In this embodiment, the second adhesive material is dispersed as a discontinuous phase in the interface between the layer of the first pressure sensitive adhesive material and the layer of the other pressure sensitive adhesive material.

In one embodiment, a release coating overlies and is adhered to the substrate, and the composite pressure sensitive adhesive material overlies and is adhered to the release coating layer. The release coatings that can be used are described in greater detail below.

In one embodiment, the inventive laminate structure is comprised of two substrate layers overlying one another, the composite adhesive composition being adhered to one of the substrate layers, and a release coating being adhered to the other substrate layer, the adhesive composition and release coating being in contact with one another.

In any of the foregoing embodiments, each of the adhesive materials, and especially the second adhesive material, can be comprised of a single pressure sensitive adhesive material or two or more pressure sensitive adhesive materials.

The substrates used in making the laminates of the invention may comprise paper, polymer film or combination thereof. The substrate can be a metal foil such as aluminum foil, a woven or non-woven fabric such as Kevlar or Tyvek, or a fiber reinforced material including fiber reinforced polymers such as tapes and the like. The substrate can be the facestock for a label or a release liner. If the substrate is a release liner, it will have a release coating of the type discussed below coated on its surface and positioned between the liner and the composite adhesive composition.

Paper substrates are particularly useful because of the wide variety of applications in which they can be employed. Paper is also relatively inexpensive and has desirable properties such as antiblocking, antistatic, dimensional stability, and can potentially be recycled. Any type of paper having sufficient tensile strength to be handled in conventional paper coating and treating apparatus can be employed as the substrate layer. Thus, any type of paper can be used depending upon the end use and particular personal preferences. Included among the types of paper which can be used are clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having weights in the range of from about 30 to about 120 pounds per ream are useful, and papers having weights in the range of from about 40 to about 100 pounds per ream can be used. The term "ream" as used herein equals 3000 square feet. Examples of specific papers which can be utilized as substrates in preparing the laminate structures of the present invention include 41-pound offset grade bleached Kraft; 78-pound bleached Kraft paper, etc.

Alternatively, the substrate may be a polymer film, and examples of polymer films include polyolefin, polyester, polyvinyl chloride, polyvinyl fluoride (PVF), polyvinylidene difluoride (PVDF), etc., and combinations thereof. The polyolefin films may comprise polymer and copolymers of monoolefins having from 2 to 12 carbon atoms and more preferably from 2 to about 4 or 8 carbon atoms per molecule. Examples of such homopolymers include polyethylene, polypropylene, poly-1-butene, etc. The examples of copolymers within the above definition include copolymers of ethylene with from about 1% to about 10% by weight of propylene, copolymers of propylene with about 1% to about 10% by weight of ethylene or 1-butene, etc. Films prepared from blends of copolymers or blends of copolymers with homopolymers also are useful. In addition films may be extruded in mono or multilayers.

Another type of material which can be used as the substrate is a polycoated kraft liner which is basically comprised of a kraft liner that is coated on either one or both sides with a polymer coating. The polymer coating, which can be comprised of high, medium, or low density polyethylene, propylene, polyester, and other similar polymer films, is coated onto the substrate surface to add strength and/or dimensional stability to the liner. The weight of these types of liners ranges from 30 to 100 pounds per ream, with 40 to 94 pounds per ream representing a typical range. In total, the final liner is comprised of between 10% and 40% polymer and from 60% to 90% paper. For two sided coatings, the quantity of polymer is approximately evenly divided between the top and bottom surface of the paper.

The coating weight of the composite pressure sensitive adhesive composition on the substrate is generally in the range of about 3 to about 100 grams per square meter (gsm), and in one embodiment about 5 to about 100 gsm, and in one embodiment about 5 to about 50 gsm, and in one embodiment about 15 to about 30 gsm.

The release coating that can be used in making the inventive laminates can be any release coating known in the art. Silicone release coatings are preferred. The major component of the silicone release coating is a polyorganosiloxane and more often, polydimethylsiloxane. The silicone release coating compositions may be thermally cured or radiation cured. Generally, the thermally curable compositions comprise at least one polyorganosiloxane and at least one catalyst or curing agent for such polyorganosiloxane(s). Such compositions may also contain at least one cure accelerator and/or adhesivity promoter (sometimes referred to as an anchorage additive). As is known in the art, some materials have the capability of performing both functions, i.e., the capability of acting as a cure accelerator to increase the rate, reduce the curing temperature, etc., and also as an adhesivity promoter to improve bonding of the silicone composition to the substrate. The use of such dual function additives where appropriate is within the purview of the invention.

A wide variety of polyorganosiloxanes (commonly called silicones) can be used. Such polyorganosiloxanes are also sometimes referred to as polymeric silicone resins, rubbers, oils or fluids. These compositions are well known and fully described in the literature. These compositions are comprised essentially of silicon atoms connected to each other by oxygen atoms through silicon-oxygen linkages, e.g.,

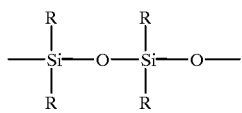

wherein each R is an organic group, generally an alkyl group. The compositions used in the practice of the invention are preferably, but not necessarily, high molecular weight polymers and copolymers having molecular weights in the range of about 5,000 to about 250,000. They should not have obtained such a degree of polymerization or condensation that they are no longer soluble in common hydrocarbon solvents such as xylene, toluene, methyl ethyl ketone, and carbon tetrachloride. In general, any organic solvent having a boiling point equal to or less than that of xylene can be used in the compositions used in the practice of the invention. The solvent merely serves as a convenient vehicle or carrier for uniform application to the substrate. Thus, higher boiling solvents can be used but require so much time for their control that their use is not commercially economical. Various polyorganosiloxanes are commercially available in organic solvents in various percent solids concentration. Exemplary of the silicone (polyorganosiloxane) materials which can be used in forming the silicone release coatings of the invention are those disclosed in U.S. Pat. Nos. 2,258,218; 2,258,220; 2,258,222; 2,494,920; 3,432,333; and 3,518,325.

Suitable catalysts which can be employed in the curing of the polyorganosiloxane release compositions include various compounds containing metals such as tin, lead, platinum, rhodium, etc. Generally, the catalysts are tin, platinum or rhodium compounds such as the dialkyl tin esters. Specific examples of catalysts include: dibutyl tin diacetate, dibutyl tin di-ethylhexanoate, dihexyl tin di-2-ethyl hexanoate, ethyl tin trihexanoate, dibutyl tin dilaurate, octadecyl tin dilaurate, dibutyl tin diacetate, tri-butyl tin acetate, dibutyl tin succinate, various lead salts such as lead naphthenate and lead octoate, zinc octoate, zinc stearate, iron octoate, various organic peroxides such as benzoyl peroxide and 2,4-dichlorobenzoyl peroxide, and others well known in the art as curing agents or catalysts for polyorganosiloxane (silicone) materials. Presently preferred catalysts include the carboxylic acid salts of organotin compounds containing at least one carbon-tin bond such as those previously mentioned. Metal complexes of platinum and rhodium are also useful. Amines and amines derivatives such as diethylene triamine, triethylene tetramine and ethanol amine, as well as amine precursors such as the isocyanate compounds and amine-functional silanes such as gamma-aminopropyl triethoxy silane can also be used as curing catalysts. The amine salts of carboxylic acids can also be used as curing agents in the silicon release coatings of the invention.

The cure accelerators and/or adhesivity promoters which can be used in the silicone release coating are also well known in the art. Exemplary of such cure accelerators and/or adhesivity promoters are amines, amine-functional silanes and amine precursors previously discussed as well as other silane derivatives such as acetoxy-functional silanes of the type vinyl

and orthosilicates such as tetra(diethylene glycol monomethyl ether) silane. Orthosilicates which have been found to be advantageous include ethylene glycol derivatives having the formula $Si[(OC_2H_4)_2OR]_4$, wherein R is alkyl or alkenyl radical having up to 8 carbon atoms, e.g., methyl, ethyl, isopropyl, butyl, octyl, vinyl, allyl, etc., and $Si(OCH_2H_4OR^1)_4$ wherein $R^1$ is an alkyl or alkenyl radical having up to 8 carbon atoms, e.g., methyl, propyl, butyl, pentyl, hexyl, allyl, pentenyl, etc. Isocyanate compounds which have been found to be effective in the practice of the invention include any isocyanate which is soluble in organic solvents and which has an average of at least two isocyanate groups per molecule. Such isocyanates can be monomeric or polymeric in nature, e.g., the isocyanate can be a partially hydrolyzed toluene diisocyanate. In other words, a urea or polyurea which still retains isocyanate groups in the molecules or a polybiuret containing unreacted isocyanate groups are typical of the isocyanate compound which can be used in the practice of the invention. Other such isocyanates include the reaction products of an isocyanate with a polyhydroxyl compound (i.e., a polyurethane or allophanates derived therefrom), the reaction product of an isocyanate and a polyamine which reaction products contain unreacted isocyanate groups. In addition the isocyanate can be a polymeric material in which the polymerization is effected by mechanisms not involving the isocyanate group.

At least some of these compounds also function as curing catalysts per se as well as cure accelerators and/or adhesivity promoters. The amount of curing agent or catalyst, cure accelerator and/or adhesivity promoter employed in the silicone release coatings of the invention can be varied widely depending upon the curing temperature, the particular catalyst used, the particular polyorganosiloxane materials selected, the particular cure accelerator and/or adhesivity promoter used, the substrate, desired curing time, etc. Usually the amount of any of such components will be in the range of 0.5 to 20 weight percent of the silicone material employed.

The silicone release compositions can be applied as solutions in organic solvents, as emulsions in water, or neat (solventless), particularly when the silicone composition is a liquid. These release compositions can be conveniently applied by any coating technique employing any type of roll coater, knife coater, or other coating device which is capable of applying a coating of the release composition in the desired amount.

Curing of the polyorganosiloxane coating material can take place at room temperature depending upon the particular silicone material used and the particular curing agent or catalyst used in conjunction with said silicone material. To avoid premature curing of silicones, the selected catalyst is typically hindered with molecules that act as blocking agents. At elevated temperatures these blocking agents disassociate from the catalyst thereby initiating the silicone cure reaction. However, for practical continuous operations the time required for curing at room temperature is too long. Most curing agents or catalysts are capable of promoting relatively rapid curing at moderate elevated temperatures. This temperature at which relatively rapid curing takes place is sometimes referred to as the curing initiating temperature even though curing will take place at room temperature. In one embodiment, this temperature is in the range of about 70° C. to about 350° C. Once curing has been initiated and maintained at an elevated temperature for a short period of time as described herein, the curing can then advantageously be allowed to proceed by aging at reduced temperatures, e.g., at room temperatures or moderately (about 10° C. to about 30° C.) above. The choice of temperature actually employed in the curing steps will depend upon a number of factors such as the type of silicone coating material used, the curing catalyst used with said silicone material, and the rate at which the coated substrate is passed through the heating zone.

Radiation-curable silicone release compositions are also useful. Radiation-curable organopolysiloxanes can be cured by ultraviolet or electron beam radiation with or without the assistance of a photoinitiator such as benzophenone. One type of organopolysiloxane which is useful in preparing release coatings contain acryloxy groups, methacryloxy groups, or mixtures thereof. A variety of acryloxy or methacryloxy containing organopolysiloxanes are known and can be used for release coatings. In one embodiment, the organopolysiloxane compounds containing acryloxy and/or methacryloxy groups which can be utilized in the present invention may be represented by the formula.

$$[R_nSiO_{4-n/2}]_m \tag{I}$$

wherein in Formula (I), each R is acryloxy, methacryloxy, an n-substituted monovalent hydrocarbon group containing from 1 to 20 carbon atoms or a substituted monovalent hydrocarbon group wherein the substituents are selected from the class consisting of chloro-, fluoro-, cyano-, amido-, nitro-, ureido-, isocyanato-, carbalkoxy-, hydroxy-, acryloxy-, methacryloxy-, etc.; n has an average value of about 1.8 to 2.2; and m has an average value greater than 2, preferably greater than about 25, and more preferably, from about 100 to about 500; the organopolysiloxane containing an average of at least one R group which contains an acryloxy or methacryloxy group, namely, $$CH_2=C(X)C(O)-O- \tag{II}$$

wherein in Formula (II), in X is hydrogen or methyl. The substituents represented by R in Formula (I) include, for example, monovalent aliphatic groups such as methyl, ethyl, propyl, hexyl, etc.; monovalent cycloaliphatic groups such as cyclohexyl, cyclopentyl, etc.; aryl groups such as phenyl, methylphenyl, benzyl, etc.; alkenyl groups such as vinyl, allyl, 3-butenyl, etc. Examples of R groups which are substituted hydrocarbon groups include pentachlorophenyl, aminomethyl, 3-aminopropyl, etc.

Each acryloxy or methacryloxy group is attached to the siloxane backbone through a carbon-to-silicon bond or a carbon-oxygen-silicon bond. More often, there are present an average of from about 2 to about 25, more preferably from about 2 to about 10 of the R groups containing an acryloxy or methacryloxy group. Alternatively, the organopolysiloxane compounds containing acryloxy and/or methacryloxy groups useful in the present invention may be defined as containing from about 3% to about 75% by weight of acryloxy or methacryloxy groups, more often from about 3% to about 50% by weight of the acryloxy or methacryloxy groups. Such polysiloxanes which are useful in this invention have an average molecular weight of from about 1000 to about 20,000. Siloxanes of higher molecular weight also may be used but the higher molecular weight siloxanes are not preferred.

Typically, the R groups in Formula (I) have the structure $$CH_2=C(X)C(O)-O-R'- \tag{III}$$

wherein in Formula (III), R' is a divalent hydrocarbon group of from 1 to about 15 carbon atoms or an oxyalkylene group containing from 1 to about 4 carbon atoms in the alkylene moiety.

The siloxanes containing the acryloxy or methacryloxy groups of Formula (III) can be prepared, for example, by reacting a siloxane containing hydroxyl groups or epoxy groups with acrylic acid or methacrylic acid. The siloxanes containing hydroxyl groups may be prepared by reacting a reactive siloxane (e.g., containing halogen) with a polyhydroxy compound such as ethylene glycol, propylene glycol, glycerol or pentaerythritol.

The organopolysiloxanes described above may be linear or branched and are preferably substantially linear. As will be recognized by those skilled in the art, the organopolysiloxanes of Formula (III) will also have an appropriate number of end-capping units, $R_3SiO-$, at the terminals of the molecule where R is as previously defined.

The organopolysiloxanes containing acryloxy and/or methacryloxy groups as described above are generally fluids which have viscosities in the range of from about 25 cps to 10,000 cps. Organopolysiloxanes of the type described above are known in the art, and various methods for producing such organopolysiloxanes are described in the patents identified in the Background. The disclosures of U.S. Pat. Nos. 3,878,263; 4,064,286; 4,301,268; 4,306,050; 4,908,274; 4,963,438; 4,978,726; and 5,034,491 are hereby incorporated by reference for their disclosure of acrylate or methacrylate containing organopolysiloxanes and methods of preparing organopolysiloxanes containing acryloxy and/or methacryloxy groups useful in the compositions of the present invention.

Organopolysiloxanes containing acryloxy and/or methacryloxy groups are available commercially from, for example, Goldschmidt Chemical Corp., Hopewell, Va. Goldschmidt's silicone acrylate series include dimethylpolysiloxanes available under the general trade designation Tergo® RC, and more particularly, under designations such as RC 450, RC 450N, RC 706, RC 707, RC 710, RC 720 and RC 726. Some of these polysiloxanes are of the type prepared by the reaction of acrylic acid or methacrylic acid with dimethylpolysiloxane containing hydroxyl groups or epoxy groups.

In one embodiment, the radiation-curable silicone release composition which can be used comprises a mixture of at least two classes of materials: (i) an organopolysiloxane containing acryloxy or methacryloxy groups, and (ii) acrylated or methacrylated organic polyhydroxy compounds or polyamino compounds. The weight ratio of (i) organopolysiloxane to (ii) acrylated and methacrylated polyhydroxy and polyamino compounds may vary over a wide range. Thus, the mixture may comprise from about 2% to about 90% by weight of the polysiloxane and from about 10% to about 98% by weight of the acrylated or methacrylated polyhydroxy and/or polyamino compounds. In one embodiment silicone release compositions can be used which contain about 2% to about 7% of the organopolysiloxane and from about 93% to 98% by weight of the acrylated or methacrylated polyhydroxy and/or polyamino compounds.

The silicone-release compositions may comprise a mixture of more than one acrylated or methacrylated organic polyhydroxy compound or polyamino compound. Such mixtures may comprise two or more derivatives derived from polyhydroxy compounds, two or more compounds derived from polyamino compounds, mixtures of one or more compounds derived from a polyhydroxy compound and one or more compounds derived from a polyamino compound. Thus, in one embodiment, the mixture comprises a mixture of from about 40% to about 70% by weight of at least one acrylated or methacrylated polyamine oligomer, and from about 30% to about 60% by weight of at least one acrylated or methacrylated polyhydroxy compound.

In one embodiment, a portion of the acrylated or methacrylated compound may be replaced by a liquid monoacrylate ester. For example, from about 1% to about 20% by weight of the polyacrylate in the above mixtures may be replaced by a liquid monoacrylate ester to modify the properties of the radiation-curable silicone release composition and, in some instances, the properties of the radiation-cured release composition. The liquid monoacrylate esters generally are characterized by a low viscosity such as from 1 to about 50 cps at 25° C., and these monoacrylate compounds are useful to improve the fluidity of the curable release compositions of the invention. Examples of such liquid monoacrylate esters include ethyl acrylate, butyl acrylate, 2-ethylhexyl acrylate, allyl acrylate, n-amyl acrylate, benzyl acrylate, cyclohexyl acrylate, diethylaminoethyl acrylate, 2-ethoxyethyl acrylate, n-lauryl acrylate, n-octyl acrylate, octadecyl acrylate, etc., the corresponding methacrylates and mixtures thereof.

The monoacrylate and methacrylate compounds do not form a network when polymerized by radiation. However, the monoacrylates do modify the network formed by the polyfunctional acrylates. These monoacrylate compounds normally copolymerize with the polyfunctional acrylates and methacrylates.

The radiation-curable release compositions that are useful optionally may contain at least one photoinitiator. The amount of photoinitiator included in the release compositions may range from about 0% to about 10%, more often from about 0.5% to about 5% based on the total weight of the radiation-curable composition. A photoinitiator is incorporated into the curable release compositions when compositions are to be cured by exposure to non-ionizing radiation such as ultraviolet light. Photoinitiators are not required when the curable silicone is cured by electron beam radiation. Examples of photoinitiators which may be used in combination with ultraviolet light includes, for example, benzyl ketals, benzoin ethers, acetophenone derivatives, ketoxime ethers, benzophenone, benzo or thioxanthones, etc. Specific examples of photoinitiators include: 2,2-diethoxyacetophenone; 2- or 3- or 4-bromoacetophenone; benzoin; benzophenone; benzoquinone; 1-chloroanthroquinone; p-diacetyl-benzene; 9,10-dibromoanthracene; 1,3-diphenyl-2-propanone; 1,4-naphthyl-phenyl ketone; 2,3-pentenedione; propiophenone; chlorothioxanthone; xanthone; and mixtures thereof.

The radiation-curable silicone release compositions are applied to the substrate prior to curing. The amount of silicone release coating applied to the substrate may vary over a wide range but generally, a coating weight of from about 0.1 to about 10 (more typically about 0.3 to 2) or more grams/m$^2$ of release composition is satisfactory. The release compositions may be applied to the substrates by any conventional means known in the coating art such as gravure, reverse gravure, offset gravure, roller coating, curtain coating, brushing, spraying, knife-over roll, metering rod, reverse roll coating, doctor knife, dipping, die coating, etc. In one embodiment, the liquid radiation-curable release compositions are applied as a third coating using offset gravure techniques. The liquid being applied to the substrate may be heated or cooled to facilitate the coating process and to alter the coating thickness.

The thickness or caliper of the release-coated substrate or liner may range from about 1 to about 10 mils, and in one embodiment from about 2 or about 4 mils to about 6 mils. The coating weight of the release coating generally ranges from about 0.5 to about 5 gsm, and in one embodiment about 1 to about 3 gsm.

Figure 2:
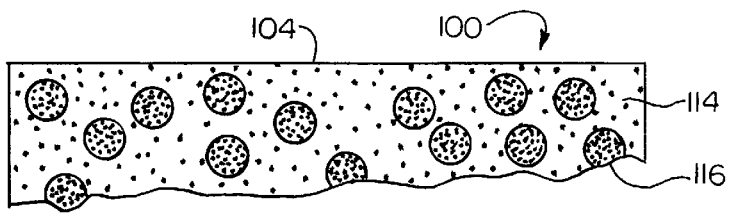
FIG. 2 is a fragmentary top plan view of the laminate of FIG. 1.

Referring now to the illustrated embodiments, and initially to FIGS. 1 and 2, a laminate structure 100 is disclosed which is comprised of a substrate 102 having a layer of a composite adhesive material 104 applied to it. The substrate has opposed surfaces 106 and 108. The composite adhesive layer has opposed surfaces 110 and 112. Composite adhesive 104 is adhered to substrate 102 at the interface of surfaces 108 and 110. The composite adhesive composition 104 is comprised of a first adhesive material 114 which is in the form of a continuous phase, and a second adhesive material 116 which is dispersed on and forms a part of the surface 112 of adhesive composition layer 104. The second adhesive material 116 is present in the form of a discontinuous phase. Adhesive material 116 is in the form of dispersed islands, the average diameter of the islands being in the range of about 1 to about 1000 microns, and in one embodiment about 5 to about 100 microns. The dispersed islands of pressure sensitive adhesive material 116 are illustrated as having uniform shapes and sizes, however, they can have and generally will have irregular shapes and sizes depending on the method in which they are deposited. The thickness of the substrate 102 is in the range of about 1 to about 10 mils, and in one embodiment about 2 to about 4 mils. The coat weight of the composite adhesive composition layer 104 is in the range of about 5 to about 100 gsm, and in one embodiment about 15 to about 30 gsm. The weight ratio of the continuous phase adhesive material 114 to the discontinuous phase adhesive material 116 can be in the range of about 500:1 to about 5:1, and in one embodiment about 100:1 to about 10:1, and in one embodiment about 20:1 to about 10:1.

Figure 3:
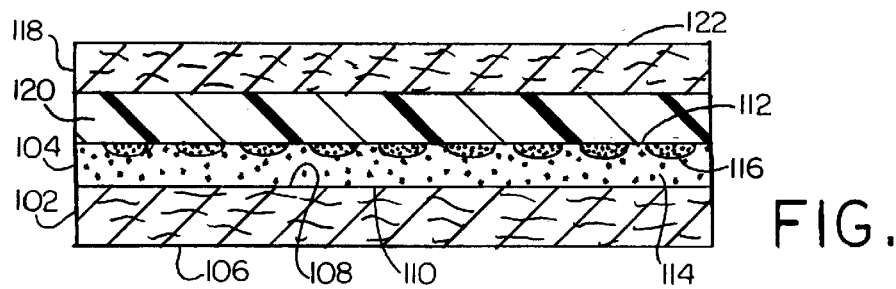
FIG. 3 is a schematic illustration of the side view of a laminate embodying the present invention in a particular form wherein a layer of a composite adhesive composition containing two pressure sensitive adhesive materials is adhered to the surface of one substrate and a release coating is adhered to the surface of another substrate, the substrates overlying one another with the adhesive layer in contact with the release coating, one of the pressure sensitive adhesive materials being in the form of a continuous phase and the other pressure sensitive adhesive material being in the form of a discontinuous phase dispersed on the surface of the first named pressure sensitive adhesive material.

The embodiment depicted in FIG. 3 is identical to the embodiment depicted in FIGS. 1 and 2 with the exception that with the embodiment depicted in FIG. 3 a second substrate 118 overlies the composite adhesive composition 104, and a release coating 120 is positioned between the substrate 118 and adhesive composition 104. The release coating 120 is adhered to the substrate 118 and to the composite adhesive composition layer 104. The coat weight of the release coating layer can be in the range of about 0.5 to about 5 gsm, and in one embodiment about 1 to about 3 gsm. The thickness of the substrate 118 can be in the range of about 1 to about 10 mils, and in one embodiment about 2 to about 6 mils.

The laminate structure depicted in FIG. 3 comprises the essential components of what is known in the label manufacturing arts as a pressure-sensitive sandwich. With such an embodiment, the substrate 102 would be referred to as the facestock, and the substrate 118 would be referred to as a release liner. This pressure-sensitive sandwich could have an anti-block or ABC coating applied to surface 122 of substrate 118 to prevent adhesive, that may have migrated from under the label, from sticking to the substrate 118 (or release liner) when the laminate is unwound. A primer layer could also be applied to the substrate 102 and be positioned between substrate 102 and composite adhesive layer 104. The primer layer could be used to increase facestock opacity, improve adhesive anchorage, prevent adhesive bleed or block plasticizer migration. Finally, a top coating could be applied to the surface 106 of substrate 102 for the purpose of improving or changing the surface properties of the label. The intent of the coating would be to develop a surface that is more receptive to printing inks or computer imprinting. In most cases the coating would be used to increase the ability of the ink to adhere to the surface thus preventing smearing or flaking of the image. The use of such antiblock coatings, primers and top coatings are well known in the art and need not be described further herein.

Figure 4:
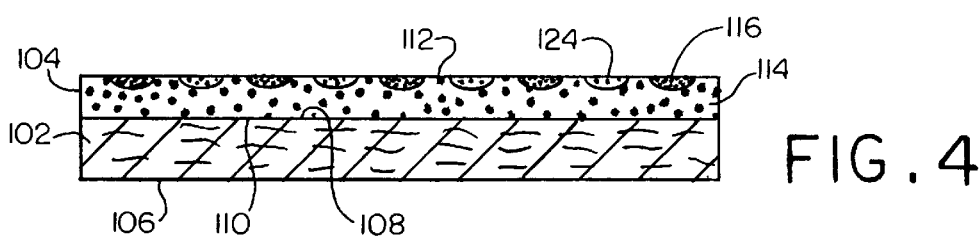
FIG. 4 is a schematic illustration of the side view of a laminate embodying the present invention in a particular form wherein a composite adhesive composition containing three pressure sensitive adhesive materials is adhered to the surface of a substrate, two of the pressure sensitive adhesive materials being dispersed as separate discontinuous phases on the surface of the third pressure sensitive adhesive material.
Figure 5:
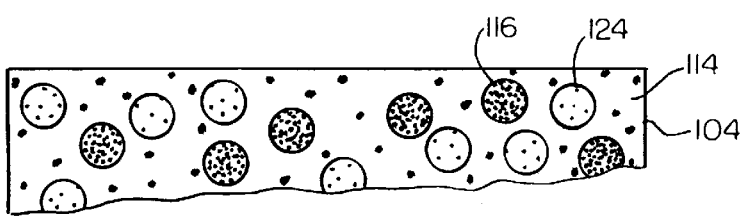
FIG. 5 is a fragmentary top plan view of the laminate of FIG. 4.

Referring to FIGS. 4 and 5, the laminate structure disclosed in these figures is identical to the laminate structure disclosed in FIGS. 1 and 2 with the exception that the second adhesive material is comprised of two separate pressure sensitive adhesive materials 116 and 124 dispersed as a discontinuous phase on the surface 112 of the first adhesive material 114. The dispersed islands of pressure sensitive adhesive materials 116 and 124 are illustrated as having uniform shapes and sizes, however, they can have and generally will have irregular shapes and sizes depending on the method in which they are deposited.

Figure 6:
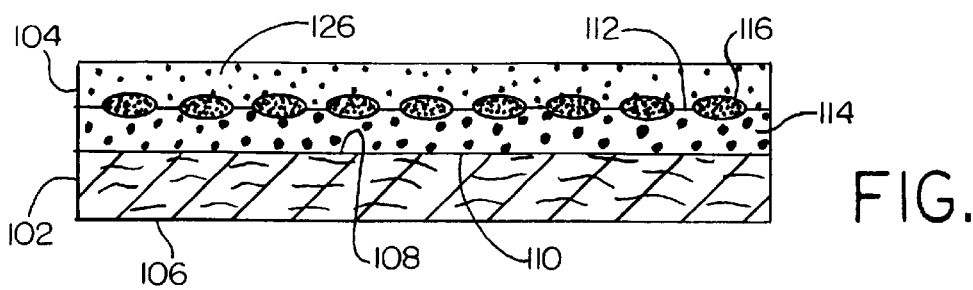
FIG. 6 is a schematic illustration of the side view of a laminate embodying the present invention in a particular form wherein a composite adhesive composition containing three pressure sensitive adhesive materials is adhered to the surface of a substrate, two of the pressure sensitive adhesive materials being in the form of separate laminate layers, one layer overlying the other, and the third pressure sensitive adhesive material being dispersed as a discontinuous phase in the interface between the layers of the first two pressure sensitive adhesive materials.
Figure 7:
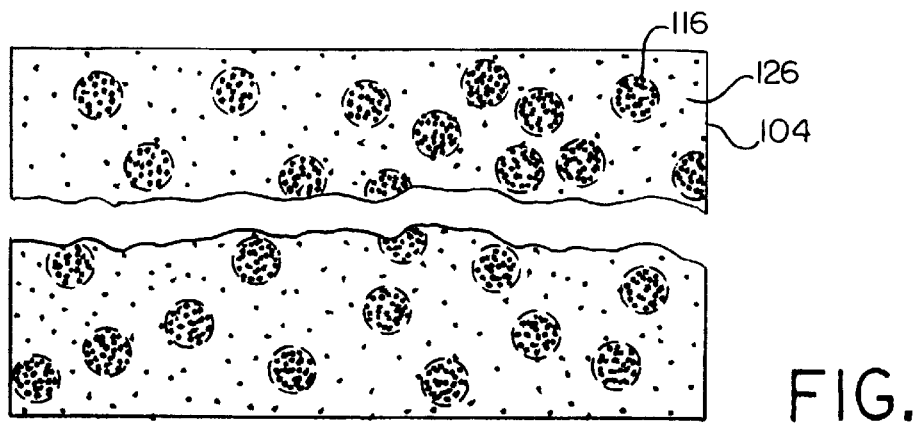
FIG. 7 is a fragmentary top plan view of the laminate of FIG. 6.

Referring to FIGS. 6 and 7, the laminate structure disclosed in these figures is identical to the laminate structure disclosed in FIGS. 1 and 2 with the exception that the composite adhesive composition 104 is comprised of three adhesive materials, namely, adhesive materials 114, 116 and 126. Adhesive material 114 is a continuous phase layer overlying substrate 102, and adhesive material 126 is a continuous phase layer overlying adhesive layer 114. Adhesive material 116 is in the form of a dispersed phase positioned in the interface between adhesive layers 114 and 126. The embodiment disclosed in these FIGS. 6 and 7 illustrates the dispersed adhesive material 116 as a single adhesive material, but in an alternate embodiment this dispersed phase could comprise two or more separate pressure sensitive adhesive materials. The coat weight of the layer of adhesive material 114 can be in the range of about 2 to about 50 gsm, and in one embodiment about 5 to about 20 gsm. The coat weight of the layer of adhesive material 126 can be in the range of about 2 to about 50 gsm, and in one embodiment about 5 to about 20 gsm. The coat weight of the adhesive 116 can be in the range of about 0.05 to about 5 gsm, and in one embodiment about 0.1 to about 3 gsm. The islands of dispersed adhesive material 116 can have an average diameter in the range of about 1 to about 1000 microns, and in one embodiment about 5 to about 100 microns. The weight ratio of the continuous phase adhesive materials (i.e., layers 114 and 126) to the discontinuous phase adhesive material 116 can be in the range of about 500:1 to about 5:1, and in one embodiment about 100:1 to about 10:1. The islands 116 are randomly dispersed in the interface between the adhesive layers 114 and 126. Although the islands 116 depicted in FIGS. 6 and 7 have identical shapes and sizes, such islands can have and generally will have varying shapes and sizes depending upon the method in which they are deposited.

Figure 8:
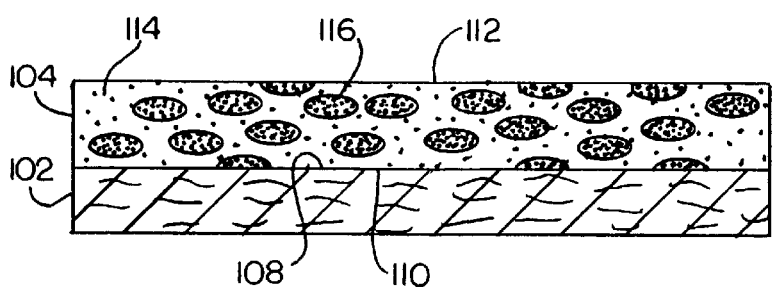
FIG. 8 is a schematic illustration of the side view of a laminate embodying the present invention in a particular form wherein a composite adhesive composition containing two pressure sensitive adhesive materials is adhered to the surface of a substrate, one of the pressure sensitive adhesive materials being dispersed as a discontinuous phase throughout the other pressure sensitive adhesive material.
Figure 9:
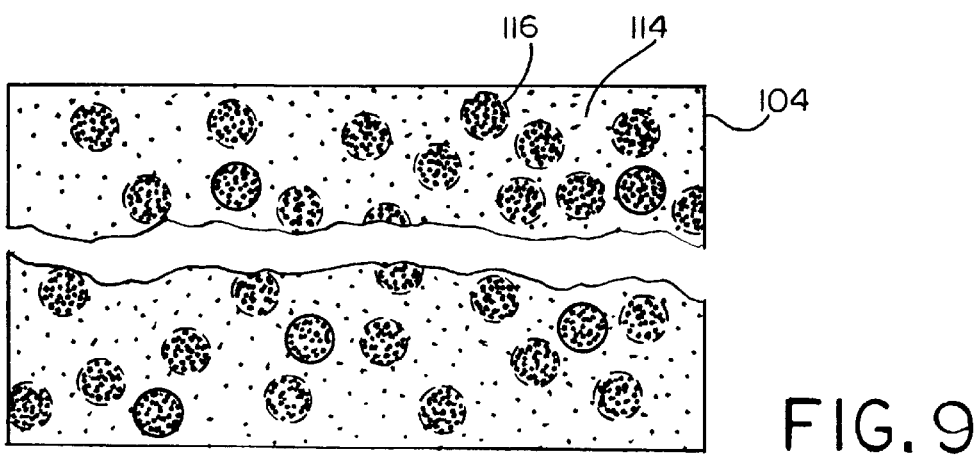
FIG. 9 is a fragmentary top plan view of the laminate of FIG. 8.

The laminate structure depicted in FIGS. 8 and 9 is identical to the structure depicted in FIGS. 1 and 2 with the exception that with the structure depicted in FIGS. 8 and 9 the second adhesive material 116 is dispersed throughout the continuous phase of the first adhesive material 114. The islands of adhesive material 116 in FIGS. 8 and 9 can have average diameters in the range of about 1 to about 1000 microns, and in one embodiment about 5 to about 100 microns. These islands can have uniform shapes and sizes as depicted in FIGS. 8 and 9, but in general the shapes and sizes of these island will vary depending on the adhesive materials used and the way in which they are dispersed. The coat weight of the composite adhesive layer 104 depicted in FIGS. 8 and 9 can be in the range of about 10 to about 50 gsm and in one embodiment about 15 to about 30 gsm. The weight ratio of the continuous phase adhesive material to the discontinuous phase adhesive material can be in the range of about 500:1 to about 5:1, and in one embodiment about 100:1 to about 10:1.

The process for making the inventive laminates involves a multistep procedure wherein contact coating techniques are used in combination with proximity coating techniques and/or non-contact coating techniques, or only proximity coating techniques and/or non-contact coating techniques are used. A contact coating technique is one in which the applicator is in contact with the substrate as the adhesive is applied. Examples of such contact coating techniques include gravure, reverse gravure, offset gravure, roller coating, brushing, knife-over roll, metering rod, reverse roll coating, doctor knife and dipping. A proximity coating technique is one in which the applicator is very close to the substrate but does not actually contact the substrate as the adhesive is applied. Examples of such proximity coating techniques include die coating. A non-contact coating technique is one in which the applicator does not contact the substrate as the adhesive is applied. Examples of such non-contacting techniques include curtain coating, interrupted curtain coating and spraying.

In one embodiment, the inventive process comprises the steps of (A) depositing at least one pressure sensitive adhesive material on to a surface of a substrate, said pressure sensitive adhesive material forming at least one discontinuous phase; and (B) depositing at least one of another pressure sensitive adhesive material onto the exposed portion of said surface of said substrate and on to the discontinuous phase formed during step (A), said another pressure sensitive adhesive material forming at least one continuous phase layer. The adhesive material that is deposited during step (A) in general remains in liquid form (i.e., hot melt, solution or emulsion) until step (B) is conducted, but, in one embodiment, the adhesive that is deposited during step (A) is dried using conventional techniques prior to step (B). During step (A) the discontinuous layer of pressure sensitive adhesive material can be applied using a contact coating technique (e.g., gravure coating) or a non-contact coating technique (e.g., spraying or interrupted curtain coating). Interrupted curtain coating is a procedure in which parts of the applied curtain of adhesive material are physically interrupted by mechanical means or are interrupted with air jets above the substrate. The discontinuous layer can be in the form of any desired controlled or radom pattern (e.g., pattern formed from a gravure roll, stripes using an interrupted curtain, or spray pattern). The continuous layer formed during step (B) can be formed using a proximity coating technique such as die coating or a non-contact coating technique such as curtain coating or spraying. The adhesive materials applied during steps (A) and (B) can each be in the form of a hot melt adhesive material, a solvent based adhesive material, or an emulsion. The coat weight of the composite layer of the two adhesive materials that is formed on the substrate can be in the range of about 3 to about 100 gsm, and in one embodiment about 15 to about 30 gsm. The weight ratio of the adhesive material in the continuous phase to the adhesive material in the discontinuous phase can be in the range of about 500:1 to about 5:1, and in one embodiment about 100:1 to about 10:1. The continuous and the discontinuous layers of adhesive that are deposited, and especially the discontinuous layer deposited during step (A), can be comprised of a single pressure sensitive adhesive material or two or more separate pressure sensitive adhesive materials. The composite adhesive layer can be in the form of a permanent adhesive or a removable adhesive. The substrate can be, for example, a paper substrate, polymer film substrate or combination thereof. The substrate can be a metal foil or a fabric. The surface of the substrate to which the adhesive is applied can be non-coated or it can be pre-coated with, for example, a release coating.

In one embodiment, the inventive process comprises the steps of (A) depositing at least one layer of a pressure sensitive adhesive material on to a substrate, said pressure sensitive adhesive material forming at least one continuous phase layer, and (B) depositing at least one of another pressure sensitive adhesive material on to the adhesive layer formed during step (A), said another pressure sensitive adhesive material forming at least one discontinuous phase. The adhesive material that is deposited during step (A) in general remains in liquid form (i.e., hot melt, solution or emulsion) until step (B) is conducted, but, in one embodiment, the adhesive that is deposited during step (A) is dried using conventional techniques prior to step (B). The continuous phase layer that is formed during step (A) can be formed using any of the known techniques for applying a layer of pressure sensitive adhesive material to a substrate. These include both contact coating, proximity coating and non-contact coating techniques. Examples include roller coating, curtain coating, brushing, spraying, knife over roll coating, metering rod coating, reverse roller coating, doctor knife coating, dipping, die coating, and the like. The discontinuous phase layer that is formed during step (B) is formed using a non-contact coating technique such as spraying or interrupted curtain coating. During each of steps (A) and (B), and especially during step (B), a single adhesive material can be deposited, or two or more separate adhesive materials can be deposited. The adhesive materials applied during steps (A) and (B) can each be in the form of hot melt adhesive materials, solvent based adhesive materials, or emulsions. The coat weight of the composite layer of the two adhesive materials that is formed on the substrate can be in the range of about 3 to about 100 gsm, and in one embodiment about 15 to about 30 gsm. The weight ratio of the adhesive material in the continuous phase to the adhesive material in the discontinuous phase is in the range of about 500:1 to about 5:1, and in one embodiment about 100:1 to about 10:1. The composite adhesive layer can be in the form of a permanent adhesive or a removable adhesive. The substrate can be a paper substrate, polymer film substrate or combination thereof. The surface of the substrate to which the adhesive is applied can be non-coated or it can be pre-coated with a release coating. In one embodiment, this process can optionally include a third adhesive application step (C) which is comprised of depositing a layer of at least one still another pressure sensitive adhesive material on to the discontinuous layer formed during step (B) and the exposed portion of the continuous layer formed during step (A), said still another pressure sensitive adhesive material forming at least one continuous phase. The adhesive materials deposited during steps (A) and (B) in general remain in liquid form (i.e., hot melt, solution or emulsion) until step (C) is conducted, but, in one embodiment, the adhesives that are deposited during steps (A) and/or (B) are dried using conventional techniques prior to step (C). The additional pressure sensitive adhesive layer deposited during step (C) can be deposited using proximity coating techniques such as die coating or non-contact coating techniques such as curtain coating or spraying. This additional layer can have a coat weight in the range of about 0.05 to about 5 gsm, and in one embodiment about 0.2 to about 3 gsm . The overall coat weight of the composite adhesive composition comprised of the two continuous phase layers formed during steps (A) and (C) and the discontinuous phase layer formed during step (B) can be in the range of about 3 to about 100 gsm, and in one embodiment about 15 to about 30 gsm. The weight ratio of the continuous phase adhesive materials to the discontinuous phase adhesive material can be in the range of about 500:1 to about 5:1, and in one embodiment about 100:1 to about 10:1.

In one embodiment, the inventive process comprises the steps of (A) forming an emulsion of at least two separate pressure sensitive adhesive materials, at least one of the pressure sensitive adhesive materials forming at least one continuous phase, and at least one of the other pressure sensitive adhesive materials forming at least one discontinuous phase dispersed in said continuous phase; and (B) depositing a layer of said emulsion on to the surface of a substrate. During step (A), two or more pressure sensitive adhesive materials can be used to form two or more separate continuous phases, and two or more of said other pressure sensitive adhesive materials can be used to form two or more separate discontinuous phases. Step (B) is performed using a contact coating technique, a proximity coating technique or a non-contact coating technique. These include roller coating, curtain coating, brushing, spraying, knife-over roll coating, metering rod coating, reverse roll coating, doctor knife coating, dipping or die coating. The substrate can be comprised of paper, a polymer film or a combination thereof. The surface of the substrate that is coated can be untreated or it can be pre-coated with a release coating. The adhesive materials mixed during step (A) are independently in the form of hot melt adhesive materials, solvent based adhesives, or emulsions. The mixture formed during step (A) is an emulsion. The coat weight of the composite adhesive layer that is formed on the substrate can be in the range of about 3 to about 100 gsm, and in one embodiment about 15 to about 30 gsm. The weight ratio of the adhesive material in the continuous phase to the adhesive material in the discontinuous phase is in the range of about 500:1 to about 5:1, and in one embodiment about 100:1 to about 10:1. Each of the phases, and especially the discontinuous phase (s), can be comprised of a single pressure sensitive adhesive material or two or more separate pressure sensitive adhesive materials. The composite adhesive layer can be in the form of a permanent adhesive or a removable adhesive.

In one embodiment, the inventive process comprises the step of simultaneously spraying at least one first pressure sensitive adhesive material and at least one second pressure sensitive adhesive material on to a substrate. The first pressure sensitive adhesive material forms at least one continuous phase. The second pressure sensitive adhesive material forms at least one discontinuous phase dispersed in the continuous phase of the first pressure sensitive adhesive material. The flow rate of the first pressure sensitive adhesive material is greater than the flow rate of the second pressure sensitive adhesive material. Two or more pressure sensitive adhesive materials can be used to form two or more separate continuous and/or discontinuous phases. The substrate can be comprised of paper, a polymer film or a combination thereof. The surface of the substrate that is coated can be untreated or it can be pre-coated with a release coating. Each of the adhesive materials can be in the form of hot melt adhesive materials, solvent based adhesives, or emulsions. The coat weight of the composite adhesive layer that is formed on the substrate can be in the range of about 3 to about 100 gsm, and in one embodiment about 15 to about 30 gsm. The weight ratio of the adhesive material in the continuous phase to the adhesive material in the discontinuous phase is in the range of about 500:1 to about 5:1, and in one embodiment about 100:1 to about 10:1. The ratio of the flow rate of the sprayed adhesive material for the continuous phase to the flow rate of the adhesive material for the discontinuous phase is generally in the range of about 500:1 to about 5:1, and in one embodiment about 100:1 to about 10:1. Each of the phases, and especially the discontinuous phase(s), can be comprised of a single pressure sensitive adhesive material or two or more separate pressure sensitive adhesive materials. The composite adhesive layer can be in the form of a permanent adhesive or a removable adhesive.

In one embodiment, the inventive process is a process for making a laminate comprising a substrate, a composite pressure sensitive adhesive, and a release coated substrate, the process comprising: (A) depositing at least one pressure sensitive adhesive material on to a surface of said substrate to form an adhesive coated substrate, said pressure sensitive adhesive material forming at least one discontinuous phase; (B) depositing at least one of another pressure sensitive adhesive material on to said release coated substrate to form an adhesive coated release substrate, said another pressure sensitive adhesive material forming at least one continuous phase; and (C) combining said adhesive coated substrate and said adhesive coated release substrate to form said laminate. The adhesive materials that are deposited during steps (A) and (B) are preferably dried using conventional techniques prior to step (C). During step (A) the discontinuous layer of pressure sensitive adhesive material can be applied using a contact coating technique (e.g., gravure coating) or a non-contact coating technique (e.g., spraying or interrupted curtain coating). The discontinuous layer can be in the form of any desired controlled or radom pattern (e.g., pattern formed from a gravure roll, stripes using an interrupted curtain, or spray pattern). The continuous layer formed during step (B) can be formed using any of the above mentioned contact coating, proximity coating or non-contact coating techniques. The adhesive materials applied during steps (A) and (B) can each be in the form of a hot melt adhesive material, a solvent based adhesive material, or an emulsion. Contacting techniques known in the art for making pressure sensitive labels, tapes, and the like, can be used to combine the adhesive containing substrates during step (C). The coat weight of the composite adhesive layer formed during step (C) can be in the range of about 3 to about 100 gsm, and in one embodiment about 15 to about 30 gsm. The weight ratio of the adhesive material in the continuous phase to the adhesive material in the discontinuous phase can be in the range of about 500:1 to about 5:1, and in one embodiment about 100:1 to about 10:1. The continuous and the discontinuous layers of adhesive that are deposited, and especially the discontinuous layer deposited during step (A), can be comprised of a single pressure sensitive adhesive material or two or more separate pressure sensitive adhesive materials. The composite adhesive layer can be in the form of a permanent adhesive or a removable adhesive. Each of the substrates can be comprised of, for example, paper, polymer film, or a combination thereof, although other substrates such as metal foil, fabric and the like can also be used.

In one embodiment, the inventive process is a process for making a laminate comprising a substrate, a composite pressure sensitive adhesive, and a release coated substrate, the process comprising: (A) depositing at least one pressure sensitive adhesive material on to a surface of said substrate to form an adhesive coated substrate, said pressure sensitive adhesive material forming at least one continuous phase; (B) depositing at least one of another pressure sensitive adhesive material on to said release coated substrate to form an adhesive coated release substrate, said another pressure sensitive adhesive material forming at least one discontinuous phase; and (C) combining said adhesive coated substrate and said adhesive coated release substrate to form said laminate. The adhesive materials that are deposited during steps (A) and (B) are preferably dried using conventional techniques prior to step (C). The continuous phase layer that is formed during step (A) can be formed using any of the known techniques for applying a layer of pressure sensitive adhesive material to a substrate. These include contact coating, proximity coating and non-contact coating techniques. Examples include roller coating, curtain coating, brushing, spraying, knife over roll coating, metering rod coating, reverse roller coating, doctor knife coating, dipping, die coating, and the like. The discontinuous phase layer that is formed during step (B) is formed using a contact coating technique such as gravure or a non-contact coating technique such as spraying or interrupted curtain coating. During each of steps (A) and (B), and especially during step (B), a single adhesive material can be deposited, or two or more separate adhesive materials can be deposited. The adhesive materials applied during steps (A) and (B) can each be in the form of hot melt adhesive materials, solvent based adhesive materials, or emulsions. Contacting techniques known in the art for making pressure sensitive labels, tapes, and the like, can be used to combine the adhesive containing substrates during step (C). The coat weight of the composite layer of the two adhesive materials that is formed during step (C) can be in the range of about 3 to about 100 gsm, and in one embodiment about 15 to about 30 gsm. The weight ratio of the adhesive material in the continuous phase to the adhesive material in the discontinuous phase is in the range of about 500:1 to about 5:1, and in one embodiment about 100:1 to about 10:1. The composite adhesive layer can be in the form of a permanent adhesive or a removable adhesive. Each of the substrates can be independently comprised of paper, polymer film, or combination thereof, although other substrates such as metal foil, fabric, and the like can also be used.

With each of the foregoing techniques, the composite pressure sensitive adhesive composition can be applied directly to the intended substrate. The substrate can be any of the foregoing mentioned substrates, including paper substrates, polymer film substrates and combinations thereof, metal foil substrates, fabric substrates, and the like. Alternatively, the composite adhesive composition can be applied to a release coated substrate (e.g., a release coated liner made of paper, polymer film or combination thereof) and then subsequently transferred to another substrate (e.g., the facestock of a label) using standard transfer techniques.

The inventive process, in its illustrated embodiments, is disclosed in FIGS. 10–14. In the embodiment disclosed in FIG. 10, a two step process is disclosed for depositing composite adhesive composition 104 on substrate 102. A spray apparatus 200 is used for the first step and a curtain coating apparatus 202 is used for the second step. Substrate 102 is advanced from left to right. A first adhesive material 128 is sprayed on surface 108 of substrate 102 to form a discontinuous phase layer. Then a second pressure sensitive adhesive material 114 is deposited on the exposed portion of surface 108 and on the discontinuous phase layer of pressure sensitive adhesive material 128 formed during the prior spraying step using curtain coating apparatus 202. The layer of adhesive material 114 is in the form of a continuous phase. The surface 108 of substrate 102 can be a non-coated surface or it can be pre-coated with a release coating.

Figure 11:
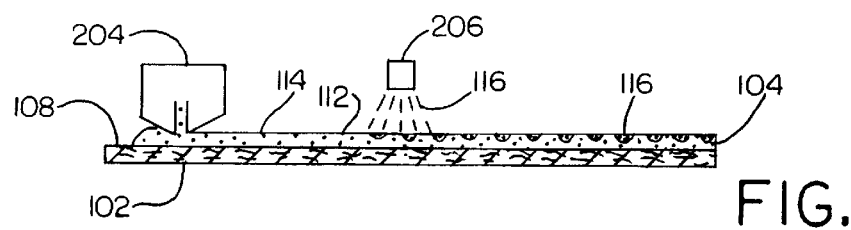
FIG. 11 is a schematic illustration of the inventive process in a particular form wherein a first pressure sensitive adhesive material is applied to the surface of a substrate in the form of a laminate layer using die coating, and then a second pressure sensitive adhesive material is applied to the surface of the first pressure sensitive adhesive material using spraying.

The embodiment depicted in FIG. 11 involves a two step process using die coater 204 and spray apparatus 206. Substrate 102 is advanced from left to right. A layer of adhesive material 114 is deposited on surface 108 of substrate 102 using die coater 204. The deposited adhesive material 114 is in the form of a continuous phase. The substrate advances from die coater 204 to spray apparatus 206 where adhesive material 116 is deposited on the surface 112 of adhesive material 114. The deposited adhesive material 116 is in the form of a discontinuous phase dispersed on and forming a part of the surface 112 of adhesive material 114. The laminate structure made in accordance with the process disclosed in FIG. 11 is the same as the laminate structure disclosed in FIGS. 1 and 2. The surface 108 of substrate 102 can be a non-coated surface or it can be pre-coated with a release coating.

Figure 10:
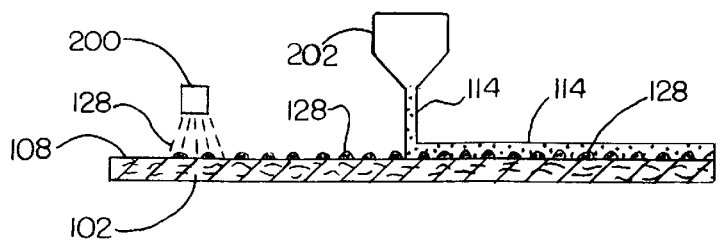
FIG. 10 is a schematic illustration of the inventive process in a particular form wherein a first pressure sensitive adhesive material is applied to the surface of a substrate in droplet form using spraying, and then a second pressure sensitive adhesive material is applied to the substrate over the first pressure sensitive adhesive material using curtain coating.
Figure 12:
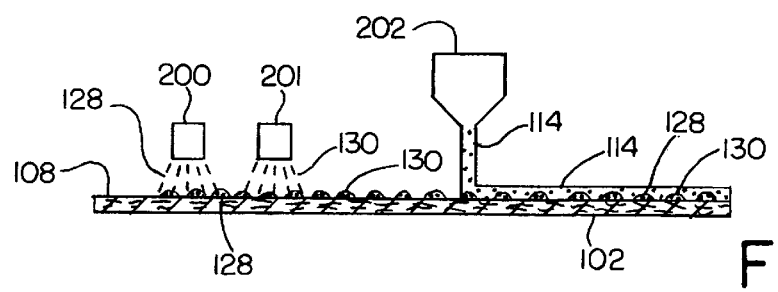
FIG. 12 is a schematic illustration of the inventive process in a particular form wherein two separate pressure sensitive adhesive materials are applied to the surface of a substrate in droplet form using spraying, and then a third pressure sensitive adhesive material is applied to the substrate over the first two pressure sensitive adhesive materials using curtain coating.

The embodiment disclosed in FIG. 12 is the same as the embodiment disclosed in FIG. 10 with the exception that a second spray apparatus 201 is used to spray a second adhesive material 130 on surface 108 of substrate 102. The substrate 102 is advanced from left to right. During the first two steps of the process adhesive materials 128 and 130 are sprayed on surface 108 using spray apparatus 200 and 201, respectively. The substrate is then advanced to curtain coater 202 where adhesive material 114 is deposited on the exposed portion of surface 108 and the sprayed adhesives 128 and 130. The sprayed adhesives 128 and 130 form separate discontinuous phases on surface 108. Adhesive 114 forms a continuous phase layer. The sprayed adhesives 128 and 130 can be the same or they can be different. The surface 108 of substrate 102 can be a non-coated surface or it can be pre-coated with a release coating.

Figure 13:
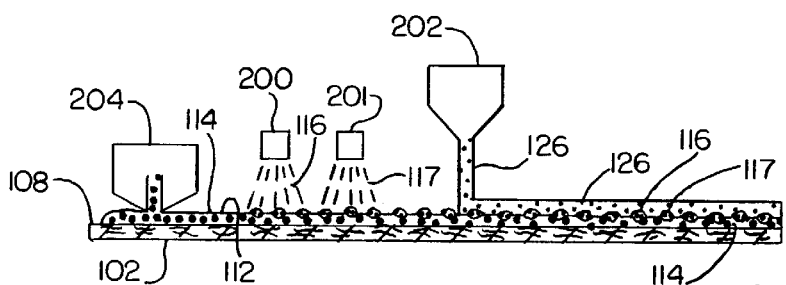
FIG. 13 is a schematic illustration of the inventive process in a particular form wherein a first pressure sensitive adhesive material is applied to the surface of a substrate in the form of a laminate layer using die coating, then a second pressure sensitive adhesive material is applied to the surface of the first pressure sensitive adhesive material using spraying, and then a third pressure sensitive adhesive material is applied in the form of a laminate layer over the first and second pressure sensitive adhesive materials using curtain coating.

The embodiment disclosed in FIG. 13 involves a four step application process using die coater 204, spray apparatus 200 and 201, and curtain coater 202. The substrate 102 is advanced from left to right. Adhesive material 114 is deposited on surface 108 of substrate 102 using die coater 204. The adhesive material 114 is applied in the form of a continuous phase layer. Then adhesive materials 116 and 117 are sprayed on surface 112 of adhesive material 114 using spray apparatus 200 and 201, respectively. The adhesive materials 116 and 117 can be the same or they can be different. Adhesive materials 116 and 117 form separate discontinuous phases on the surface 112 of adhesive material 114. The coated substrate is advanced to curtain coater 202 where adhesive material 126 is deposited on the exposed portion of surface 112 of adhesive material 114 and on sprayed adhesive materials 116 and 117. Adhesive material 126 is applied in the form of a continuous phase layer. The resulting laminate structure is identical to the structure disclosed in FIGS. 6 and 7 when the adhesive materials 116 and 117 are the same. The surface 108 of substrate 102 can be a non-coated surface or it can be pre-coated with a release coating.

Figure 14:
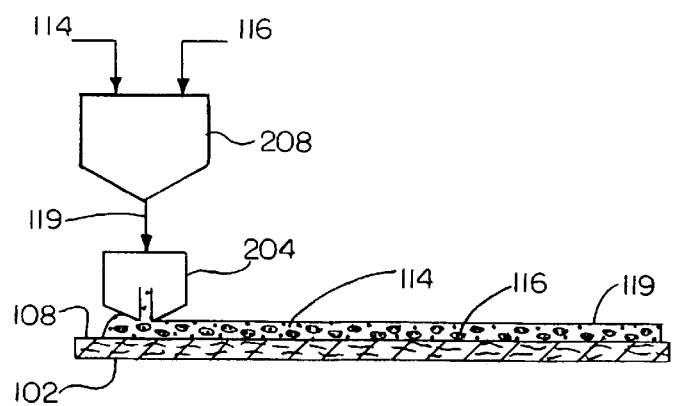
FIG. 14 is a schematic illustration of the inventive process in a particular form wherein first and second pressure sensitive adhesive materials are mixed to form an emulsion, and then the emulsion is applied to the surface of a substrate using die coating.

The embodiment disclosed in FIG. 14 is comprised of a two step process using mixer 208 and die coater 204. Adhesive materials 114 and 116 are mixed in mixer 208 under emulsion forming conditions. Adhesive material 114 forms a continuous phase, and adhesive material 116 forms a discontinuous phase dispersed in the continuous phase of adhesive material 116. The resulting emulsion 119 is advanced to die coater 204 where it is deposited on the surface 108 of substrate 102. The resulting laminate structure is identical to the laminate structure disclosed in FIGS. 8 and 9. The surface 108 of substrate 102 can be a non-coated surface or it can be pre-coated with a release coating.

EXAMPLES

Laminate structures are formed using a high gloss facestock, Adhesive No.1, Adhesive No. 2, and a release coated liner. The facestock is 60# New Era KromeKote Litho (a product of Champion identified as a 60# paper that is cast coated on one side and has a blue-white shade). Adhesive No. 1 is Narco 38-4542. Adhesive No. 2 is PSA-4. Adhesive No. 2 is diluted with distilled water to provide the emulsion with a 17% by weight solids content. The release coated liner is silicone treated. The ambient temperature is 24° C. and humidity is 30%.

The laminate structures are made using a mobile glass cart which is drawn through a spray booth assembly. The glass cart has a support platform consisting of a sheet of glass (24×36×¼ inch) horizontally mounted on wheels, a sheet of polystyrene foam padding (12×27×⅛") overlying the glass sheet, and a sheet of high gloss 100# paper facestock (14×30 inch) overlying the foam padding with the gloss side up. Draw-down bars gauged at 19, 29, 42 and 55 grams per square meter (gsm) are used for the application of Adhesive No. 1.

A spray booth consisting of a spray apparatus and a ventilation chamber is used to spray Adhesive No. 2. The spray apparatus consists of a siphon/gravity-feed spray assembly (¼ JAU stainless steel spray gun and SUIA stainless steel spray nozzle obtained from Spray Systems Co., Cincinnati, Ohio) which employs separate ¼ inch nylon tubing air and liquid lines. The air pressure for the spray is 20 psig, and the siphon height is 6 inches. A glass panel (2×6×3/16 inch) is used to collect sprayed adhesive drops to monitor spray coat weight. A section (9 inches in length) of the applied Adhesive No. 1 is covered to prevent spray from contacting the adhesive surface to produce control samples having only Adhesive No. 1 applied.

The laminates are prepared using the following procedure:

(1) The facestock is placed glossy side down on the support platform of the mobile glass cart.

(2) Adhesive No. 1 is poured on the support platform next to the front end of the facestock.

(3) Adhesive No. 1 is drawn down with the desired draw-down bar on the facestock from the front end of the facestock to the back end. The coat weight for each sample is indicated below.

(4) A cover is placed over the first 9 inches of the drawn-down Adhesive No. 1.

(5) The mobile glass cart is moved through the spray assembly, and as the cart moves through the assembly, Adhesive No. 2 is sprayed on Adhesive No. 1 (or on the cover placed over the first 9 inches of Adhesive No. 1).

(6) The cover overlying Adhesive No. 1 is removed.

(7) The test sample consisting of the facestock with the applied Adhesives No. 1 and No. 2 is placed in a drying oven and dried at 100° C. for 5 minutes.

(8) The test sample is removed from the drying oven and held at room temperature for 1 hour to allow the test sample to equilibrate with the moisture in the ambient air.

(9) The release coated liner is placed over the deposited adhesives to produce the desired laminate sample. The laminate is allowed to stand for 24 hours at room temperature (24° C.) to allow it to equilibrate with the moisture in the ambient air.

(10) The laminate samples are cut into 1×8 inch sample sizes. The release liner is removed from the sample. The sample is applied to a stainless steel substrate surface. An Instron (Model No. 1130) tensile tester is used to measure the peel force necessary to remove the test sample from the substrate surface while the peel load acts at a specified speed and at a direction of 90° to the test sample. The peel test results are expressed in terms of pounds per inch of width of sample (lb/in). The results are indicated in the following Table I.

TABLE I

| Sample | Adhesive Coat Weight, (gsm) | | 90° Peel (lb/in) |
|---|---|---|---|
| | No. 1 | No. 2 | |
| 1 | 18 | — | 0.20 |
| 2 | 18 | 0.37 | 0.45 |
| 3 | 27 | — | 0.40 |
| 4 | 27 | 0.34 | 0.75 |
| 5 | 42 | — | 0.50 |
| 6 | 42 | 0.35 | 0.85 |
| 7 | 47 | — | 0.85 |
| 8 | 47 | 0.35 | 1.30 |
| 9 | 18 | — | 0.20 |
| 10 | 18 | 2.86 | 0.75 |
| 11 | 17 | — | 0.20 |
| 12 | 17 | 2.16 | 0.60 |
| 13 | 16 | — | 0.20 |
| 14 | 16 | 0.11 | 0.30 |

The present invention provides a number of advantages over the prior art. These include the ability to achieve a synergistic adhesive performance by virtue of the composite adhesive structures provided by the invention. In this regard, for example, by depositing a discontinuous pressure sensitive adhesive on the surface of a continuous pressure sensitive adhesive, it is possible to tailor the surface and bulk characteristics of the resulting composite adhesive independently and thereby achieve a wide range of desired performance characteristics. Thus, the composite adhesive can be tailored for application to a wide variety of substrates with different surface characteristics as well as different physical conditions (e.g., temperature, moisture, etc.) The inventive process provides flexibility in making different composite adhesive structures simply by re-arranging the sequence of using the various adhesive coating techniques or devices. The use of non-contact coating techniques in the inventive process provides the process with the advantages of fewer instances of web break, the opportunity for quick change-over, less exposure to air prior to coating, and lower material and process costs.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for forming a composite pressure sensitive adhesive on the surface of a substrate, comprising:

(A) depositing a discontinuous layer of a pressure sensitive adhesive material on said substrate, said pressure sensitive adhesive material being in the form of a hot melt adhesive, solution or emulsion, said discontinuous layer of said pressure sensitive adhesive material covering parts of said substrate and leaving parts of said substrate exposed; and (B) depositing a continuous layer of another pressure sensitive adhesive material on said discontinuous layer of said pressure sensitive adhesive material from step (A) and on the exposed parts of said substrate using proximity coating or non-contact coating; said discontinuous layer from step (A) being in the form of a hot melt adhesive, solution or emulsion during step (B); said another pressure sensitive adhesive material being in the form of a hot melt adhesive, solution or emulsion during step (B); said adhesive materials used during steps (A) and (B) being sufficiently non-soluble relative to each other so that at least about 50% by weight of said pressure sensitive adhesive material from step (A) remains in said discontinuous layer.

2. The process of claim 1 wherein said substrate comprises paper, polymer film, a combination of paper and polymer film, metal foil or fabric.

3. The process of claim 1 wherein said substrate has a release coating applied to its surface, and the adhesive materials deposited during steps (A) and (B) are applied over the release coating.

4. The process of claim 1 wherein the adhesive materials deposited during steps (A) and (B) independently are rubber based adhesives, acrylic adhesives, vinyl ether adhesives, silicone adhesives, or a combination of two or more thereof.

5. The process of claim 1 wherein two or more pressure sensitive adhesive materials are deposited during step (A).

6. The process of claim 1 wherein said another pressure sensitive adhesive material is deposited during step (B) using die coating, curtain coating or spraying.

7. A process for forming a composite pressure sensitive adhesive on the surface of a substrate, comprising:

(A) depositing a continuous layer of a pressure sensitive adhesive material on said substrate, said pressure sensitive adhesive material being in the form of a hot melt adhesive, solution or emulsion; and (B) depositing a discontinuous layer of another pressure sensitive adhesive material on the continuous layer of said pressure sensitive adhesive material from step (A) using non-contact coating; said pressure sensitive adhesive material from step (A) being in the form of a hot melt adhesive, solution or emulsion during step (B); said another pressure sensitive adhesive material being in the form of a hot melt adhesive, solution or emulsion during step (B); said pressure sensitive adhesive material from step (A) and said another pressure sensitive adhesive material from step (B) being sufficiently non-soluble relative to each other so that at least about 50% by weight of said pressure sensitive adhesive material from step (B) remains in said discontinuous layer.

8. The process of claim 7 wherein said substrate comprises paper, polymer film, a combination of paper and polymer film, metal foil or fabric.

9. The process of claim 7 wherein said substrate has a release coating applied to its surface, and the adhesive materials deposited during steps (A) and (B) are applied over the release coating.

10. The process of claim 7 wherein the adhesive materials deposited during steps (A) and (B) independently are rubber based adhesives, acrylic adhesives, vinyl ether adhesives, silicone adhesives, or a combination of two ore more thereof.

11. The process of claim 7 wherein two or more pressure sensitive adhesive materials are deposited during step (B).

12. The process of claim 7 wherein said another pressure sensitive adhesive material deposited during step (B) is deposited using interrupted curtain coating or spray coating.

* * * * *